Aug. 15, 1950  G. L. HERTER  2,518,616
GOOSE CALL
Filed May 23, 1947

Inventor
*George L. Herter*
By *Wilfred E. Lawson*
Attorney

Patented Aug. 15, 1950

2,518,616

UNITED STATES PATENT OFFICE 2,518,616

GOOSE CALL

George L. Herter, Waseca, Minn.

Application May 23, 1947, Serial No. 750,017

4 Claims. (Cl. 46—180)

This invention relates generally to sporting goods and pertains particularly to improvements in devices for sounding the call of game birds.

The present invention is directed particularly to improvements in goose calls and has for a principal object to provide a novel reed construction whereby a two note call can be sounded by the simple procedure of changing the force with which the device is blown.

Another object of the invention is to provide a goose call wherein two separate reeds are employed, one of which reeds bears against or has contact with one surface of the other reed, the two reeds being permanently joined together within a horn or air conducting conduit.

Still another object of the invention is to provide a bird call of the character stated wherein the several parts are readily removable one from the other to facilitate thorough cleaning of the device.

The invention will be best understood from a consideration of the following detailed description taken in connection with the accompanying drawing forming a part of the specification with the understanding, however, that the invention is not confined to a strict comformity with the showing of the drawing but may be changed or modified so long as such changes or modifications mark no material departure from the salient features of the invention as expressed in the appended claims.

Figure 1:
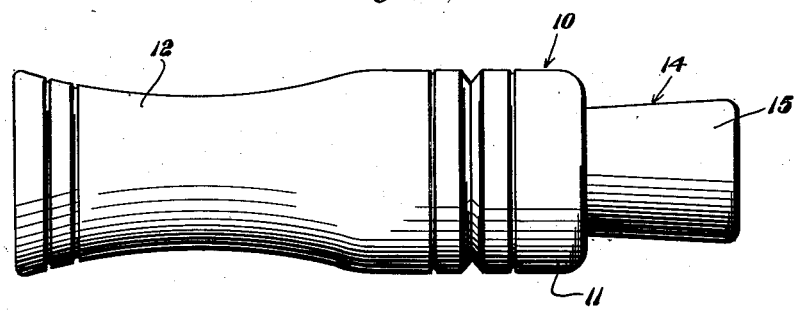
Figure 1 is a view in side elevation of a goose call constructed in accordance with the present invention.

Referring now more particularly to the drawing the numeral 10 generally designates the body of the goose call of the present invention. This body may be formed of any suitable material but is preferably turned in wood or made of hard rubber or plastic.

Figure 2:
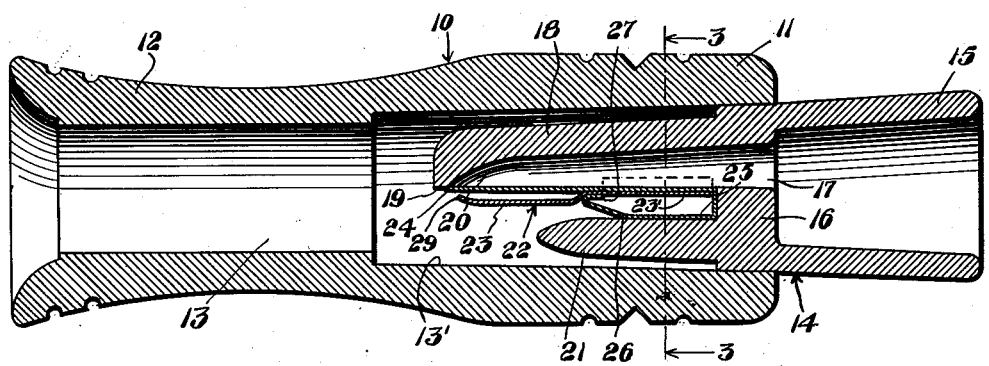
Figure 2 is a longitudinal section, on an enlarged scale, taken on the line 2—2 of Figure 1.

The body constitutes a forward end or head portion 11 and a rear or mouth piece portion 12 and, as shown in Figure 2, it has a cylindrical passage 13 formed through the length thereof, the forward portion of the passage being enlarged slightly through approximately half the length of the passage, as indicated at 13'.

Frictionally secured in the forward end of the enlarged portion 13' of the body passage, is a reed pipe which is generally designated 14 and which is slightly tapered as shown so that one end may be inserted and tightly frictionally engaged in the forward end of the passage of the body, as shown.

The forward or larger end of the reed pipe is cut out or formed to provide the horn 15, at the inner end of which is the relatively thick wall 16.

At one side of the axial center of the wall 16 there is formed the semi-circular air passage-way 17.

Integral with and extending from the rear side of the wall 16 is an arm 18 having a flat inner face 19 which lies in the plane of the axial center of the pipe and, accordingly, in the same plane as the lower side of the substantially semi-circular air passage 17. This flat face 19 of the arm 18 has formed longitudinally therein the air channel 20 which leads into the passage 17 at the forward end of the pipe while at its rear end it tapers off to terminate short of the rear end of the arm 18 as clearly shown in Figure 2.

In spaced opposed relation with the channeled face 19 of the arm 18 is a short tongue 21 which is also integral with the rear side of the wall 16 and extends rearwardly a distance approximating a little more than half the length of the arm 18.

Figure 3:
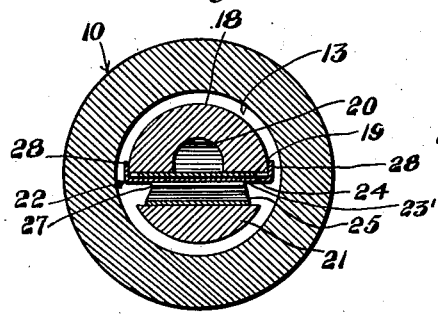
Figure 3 is a transverse section taken on the line 3—3 of Figure 2.
Figure 4:
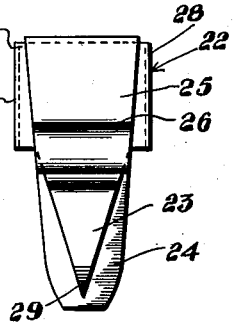
Figure 4 is a view of one side of the double reed unit.

Removably mounted in the space between the arm 18 and the tongue 21 is the reed unit which is generally designated 22. The reed unit comprises the two reed tongues 23 and 24. The reed tongue 24 is of substantial width and, as shown in Figure 2, is of slightly greater length than the air channel 20 from the rear side of the wall 16 to its tapered off rear end. This reed tongue 24 covers the air channel 20 and lies against the flat face of the arm 18 as shown in Figures 2 and 3.

Figure 5:
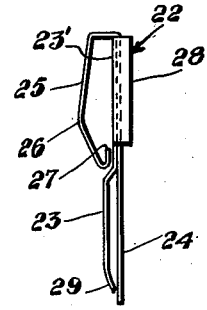
Figure 5 is a view in side elevation of the unit shown in Figure 4.
Figure 6:
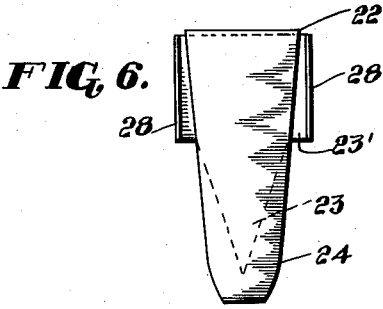
Figure 6 is a view of the opposite side of the double reed unit.

At its forward end the reed tongue 24 has a portion turned back on itself to form the spring arm 25. This spring arm is provided intermediate its ends with the hump 26 and from the hump to the free end the arm angles in toward the adjacent side of the reed tongue, terminating in close proximity thereto in the reversely bent portion 27, as shown in Figures 5. The spring arm 25 and the adjacent end portion of the reed tongue 24 are inserted between the arm 18 and the pipe tongue 21, as shown in Figure 2, and when so inserted the spring arm 25 will be compressed so that the reed tongue 24 will be tightly frictionally held in place.

The reed tongue 23 forms an integral extension or continuation of a plate member 23' which is designed to lie against the side of the reed tongue 24 nearest to the spring arm 25. This plate portion 23' has the opposed flanges 28 integral with its longitudinal edges or sides, which flanges engage the outer sides of the arm 18 as shown in Figure 3. In other words, the arm 18 is slidably frictionally held between the flanges 28.

As shown in Figure 5 and also in Figure 2, the reed tongue 23 is slightly offset from the plate portion 23' so that it is, through the major portion of its length, in spaced parallel relation with the reed tongue 24. The reed tongue 23 is substantially triangular in form and the point or tip 29 is bent in toward the reed tongue 24.

In practice the plate portion 23' of the reed tongue 23 is secured, by soldering or other suitable means, to the adjacent forward end portion of the reed tongue 24. Thus the entire reed unit 22 may be inserted into the space between the arm 18 and the pipe tongue 21 where it will be properly held by the combined action of the spaced flanges 28 engaging the opposite sides of the arm 18 and the spring arm 25 pressing against the inner side of the pipe tongue 21.

It will be readily apparent from the foregoing that the reed unit may be easily and quickly put in or taken out with respect to the pipe 14 and also that the pipe may be easily and quickly introduced into or removed from the enlarged forward end portion 13' of the passage 13 in the body of the caller.

As previously set forth, while the body 10 may be formed of any suitable material it is preferably turned in wood or made from hard rubber or plastic and likewise the pipe 14 may be formed of any suitable material but it is preferred that it be cast as a single unit of plastic or synthetic resin material having the necessary physical characteristics for such use or made from suitable wood or hard rubber.

I claim:

1. A game call, comprising a tubular body open at both ends and formed at one end to provide a mouth piece, a reed pipe removably mounted in the other end of the body, the pipe including an arm extending longitudinally in the body, the arm having a longitudinally extending flat face and an air channel formed in said flat face and communicating with an air outlet passage-way, a short tongue forming an integral part of the pipe and having spaced relation with the flat face of said arm, a reed member disposed against the flat face of the arm and closing the air channel, a spring arm forming an integral part of the reed member and frictionally held between said reed pipe arm and tongue to maintain the reed member in covering relation with said air channel, a second reed member disposed upon the first reed member and having a portion disposed between the end of said spring arm and the first reed member, and spaced side flanges carried by the second reed member and having said arm slidably frictionally engaged therebetween.

2. As a new article of manufacture a reed unit comprising a relatively long and relatively broad vibrating tongue, a resilient arm integral with one end of said vibrating tongue and having spaced relation with one side of the tongue, the other end of the resilient arm being disposed adjacent to but movable relative to the tongue, a second vibrating tongue of less length than the first tongue and disposed in juxta-position therewith upon the side adjacent to said resilient arm, a portion of the second vibrating tongue being disposed upon the first tongue between the same and the resilient arm and having the said other end of the arm pressing thereon, and a pair of spaced parallel flanges disposed at opposite sides of the unit and joined thereto.

3. A game call comprising a tubular body open at both ends and formed at one end to provide a mouth piece, a reed pipe removably mounted in the other end of the body, the pipe including an arm extending longitudinally in the body and having a longitudinal air channel in a surface thereof leading to an air outlet passage-way, a pair of reeds in juxta-position, one reed extending lengthwise over and closing said channel, resilient means maintaining the said one reed in removable position on the arm, and a pair of spaced longitudinal side flanges carried by one of the reeds and having said arm tightly frictionally engaged therebetween.

4. A new article of manufacture of the character stated in claim 2, wherein the portion of the said second vibrating tongue which is disposed between the said other end of the resilient arm and the other end of the first mentioned vibrating tongue has the side edges converging to form a terminal point which is directed downwardly toward the first mentioned tongue.

GEORGE L. HERTER.

REFERENCES CITED

The following references are of record in the file of this patent:

UNITED STATES PATENTS

| Number | Name | Date |
|---|---|---|
| 726,277 | Fuller | Apr. 28, 1903 |
| 1,801,421 | Gemeinhardt | Apr. 21, 1931 |
| 2,106,016 | Prescott | Jan. 18, 1938 |
| 2,317,458 | Herter | Apr. 27, 1943 |